United States Patent [19]
Overman

[11] 4,040,054
[45] Aug. 2, 1977

[54] TRACKING OF RADAR SIGNALS
[75] Inventor: Kelly C. Overman, Pikesville, Md.
[73] Assignee: Westinghouse Electric Corporation, Pittsburgh, Pa.
[21] Appl. No.: 608,305
[22] Filed: Aug. 27, 1975
[51] Int. Cl.² .............................................. G01S 9/02
[52] U.S. Cl. .................................. 343/7 A; 343/7.3
[58] Field of Search ................................ 343/7.3, 7 A

[56] References Cited
U.S. PATENT DOCUMENTS

| 3,707,718 | 12/1972 | Ames | 343/7 A |
| 3,900,850 | 8/1975 | Ulman | 343/7.3 |
| 3,936,823 | 2/1976 | Weber | 347/7.3 |
| 3,943,510 | 3/1976 | Orton | 343/7 A |

Primary Examiner—S.C. Buczinski
Attorney, Agent, or Firm—C. F. Renz

[57] ABSTRACT

Tracking apparatus which includes a plurality of trackers and a single track loop for tracking a plurality of radar threats or threat signals on a time-shared or time-multiplexed basis. The trackers cooperate with a receiver and a processor which processes the received threats deriving for each threat its carrier radio frequency or frequencies (RF) and its pulse-repetition interval or intervals (PRI), and determining the real time of arrival (TOA) of the pulses of each threat. All received threats in the trackers are scanned in succession periodically during scanning intervals. Each scanning interval is called a roll and each roll's duration (RO) is short compared to the PRI. During each scanning interval the TOA for the last-received pulse of each threat signal is compared with half the width of a window (W/2), neglecting the set-up time of the receiver. If TOA is greater than W/2 for any signal, RO is subtracted from the TOA and a new reduced TOA for this signal is stored in the tracker memory until the suceeding scanning operation when the above comparison and arithmetic operation is repeated. When the latest TOA is less than W/2 for any threat signal, the PRI for this signal is added to the TOA and the sum stored as the next TOA prediction for this threat signal. A correction is then carried out, during a short time interval about the pulse arrival time, to reduce the difference between the TOA and the zero of the window.

17 Claims, 15 Drawing Figures

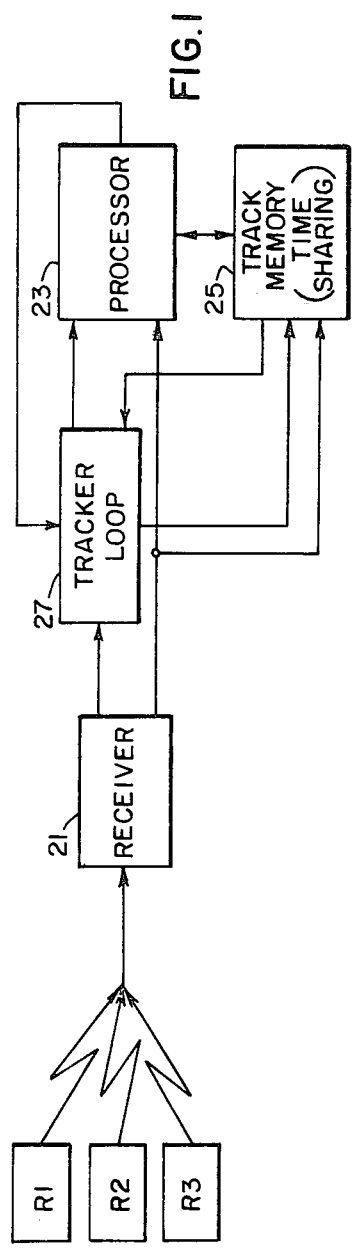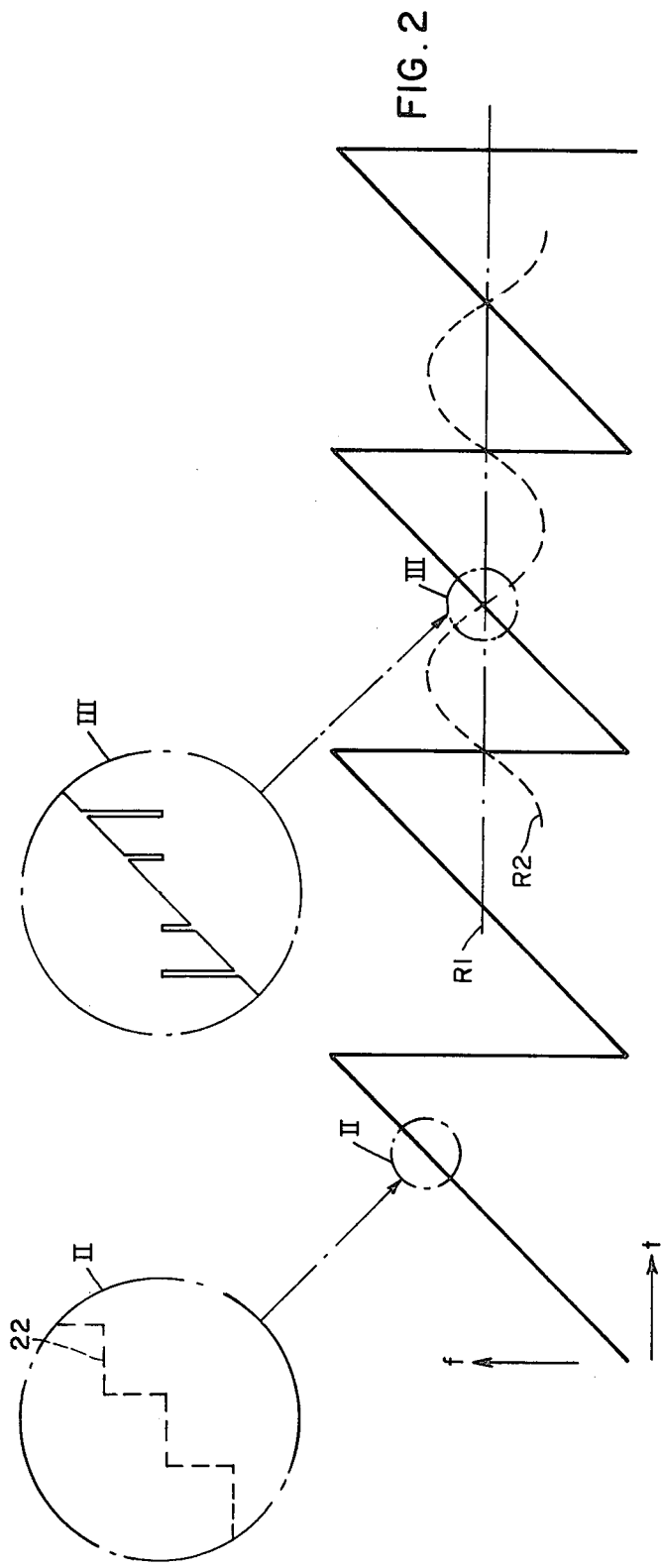

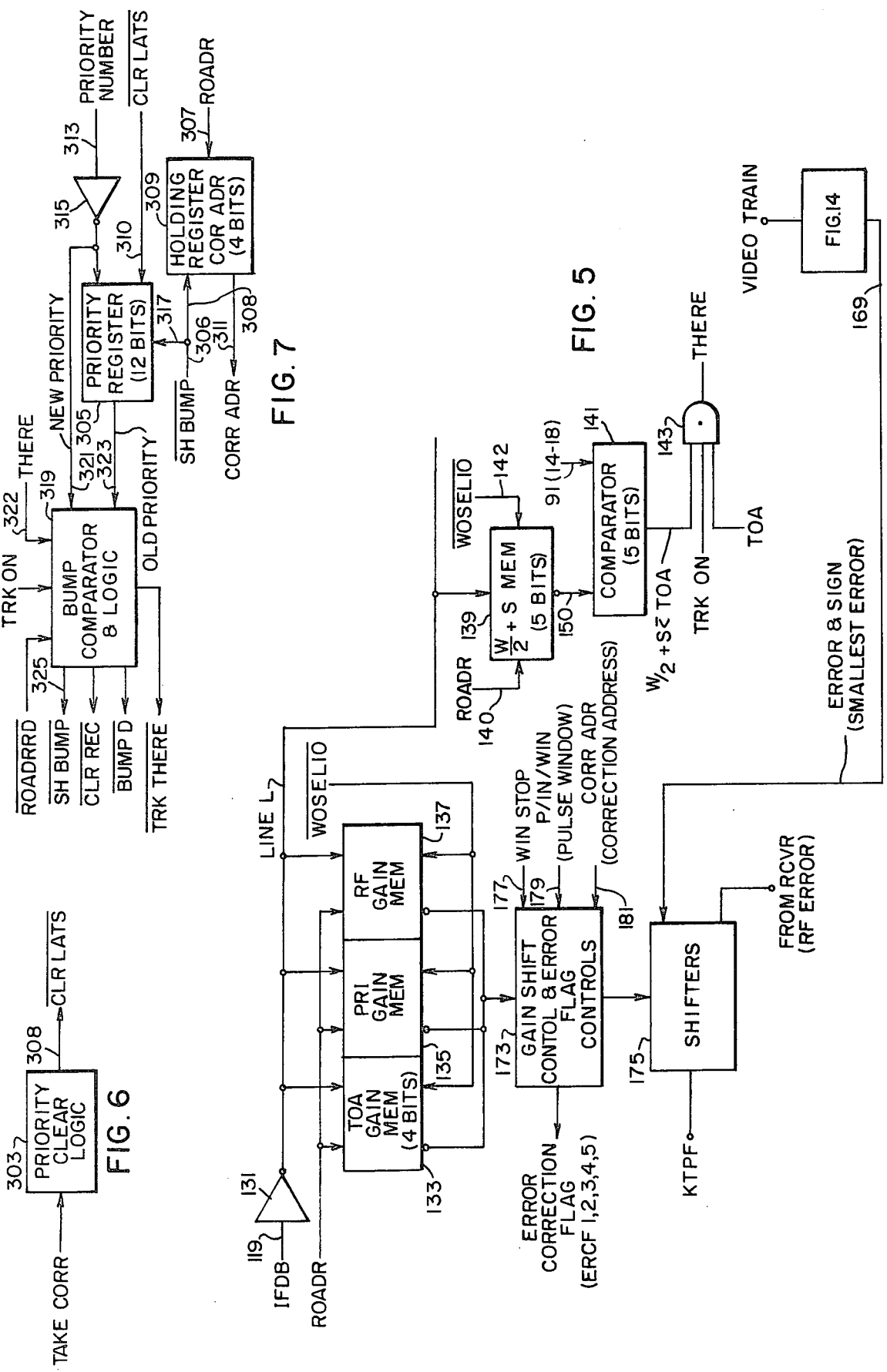

TRACKING OF RADAR SIGNALS

BACKGROUND OF THE INVENTION

This invention relates to radar or the art of detecting threats or threat signals from hostile sources or emitters and has particular relationship to the tracking of such signals. Typically this invention concerns itself with pulse-repetition-interval (herein referred to as PRI) trackers. A PRI tracker is apparatus that synchronizes with a received pulse train of a threat and generates a time-prediction parameter for each pulse in the train so that the tracker is locked to the pulse train. The tracker remains locked to the pulse train even if some of the pulses of the train are not received. This facility is called fly-wheeling.

Since trackers are used in regions which may be subject simultaneously to a number of threats, a number of trackers are demanded for the protection of any region. In accordance with the teachings of the prior art, separate trackers with separate track loops are used to detect the separate threats. Typically, prior-art PRI tracking involves hybrid digital/analog techniques which require significant quantities of hardware. Prior-art trackers have exhibited performance limitations when they encounter pulse trains which are staggered or jittered, or which contain more than an occasional missing pulse. The presence of multiple pulse trains that "walk through" each other also cause the prior-art trackers to unlock or transfer lock from one train to another. In addition to these shortcomings, the mechanizations of these trackers usually require a complete separate set of tracker hardware including a separate tracking loop for each pulse train to be tracked. The implementation of each tracker requires a significant number, usually 50 to 150 integrated circuits depending on complexity. To economize on integrated circuits and other parts, the number of trackers is minimized and usually there are fewer trackers then desired or even required. In addition, the trackers that are provided constitute a significant part of the power demand, size, and weight of the protective apparatus and present a significant part of the reliability and maintainability problems.

It is an object of this invention to overcome the above-described difficulties of the prior art and to provide for each protected region adequate tracking facilities with minimal integrated circuit demands, which facilities shall constitute only a reasonable or minor part of the power demand, size and weight and shall present only a reasonable part of the reliability and maintainability problems of the apparatus.

It is another object of this invention to overcome the hardware penalties imposed by multiple PRI tracking in prior-art apparatus and to improve tracker performance generally, and specifically with respect to pulse-train threat signals that are not well behaved. It is also an object of this invention to provide for the selection of the most logically proper of a plurality of pulses which appear in a prediction window and for the assignment of a window to the one of a plurality of pulses which has missed the window the most.

SUMMARY OF THE INVENTION

This invention arises from the realization that different trackers are structurally identical, differing only in the contents of their respective memories. In addition, it is realized that solid-state devices are available whose response is, as far as the operation of the trackers is concerned, substantially instantaneous. In accordance with this invention a single track loop is provided which is time-shared by a plurality of trackers. The track loop cooperates with a memory adequate in words to contain the data of the desired number of trackers which typically may be 16. The tracking is effected by multiplexing the tracking data from separate threats into the track memory. The tracking data is transmitted back and forth between the track loop and the memory, the data for each tracker being processed in its turn in the track loop, stored temporarily in the track memory and returned to the track loop for further processing until each signal or threat is tracked. The implementation of this tracking process may be all analog, all digital, part analog and part digital, or written into a software program of a general purpose computer. In the interest of concreteness the tracking process is treated herein as implemented all digitally.

In the multiplexed tracker according to this invention one set of circuits, or tracker loop, is used to generate a prediction window, detect the presence of a received pulse or threat in the window, and measure the time position of the pulse as well as the receiver tuning error. In addition, circuits are provided for the computations required for generation of tracking corrections both in the PRI, or time domain, as well as the RF frequency domain so that frequency commands and corrections can be applied to the receiver which typically may be of the super heterodyne type. Since all of these operations are conducted during the narrow time interval surrounding the received pulse arrival time this same set of circuits can be used to make measurements on multiple-pulse trains if some means is provided to organize and hold these data between pulses in a given pulse train. This is accomplished by providing a track memory in which is stored for each tracker channel the RF frequency of the pulse train, the PRI, the predicted time of arrival, TOA, of the next pulse along with the tracking gain constants and the tracker window width. Thus by calling up these data from the track memory for each tracker in its turn and outputting the receiver tuning commands at the appropriate times a single set of tracker circuits can be time-shared between multiple pulse trains.

Typically the multiplexed tracker according to this invention requires three groups of circuits: a track memory capable of receiving the data, including RF, PRI, TOA for each of the trackers, the time-shared tracking loop and the receiver interface network.

To expand the tracker capacity in terms of the number of pulse trains tracked it is only necessary to provide additional track-memory capacity. In this type of mechanization it is also possible to store for each tracker not only the RF, PRF and PRI tracking data, but the optimum loop gain and window-width commands as well. Individually setting these parameters optimizes each tracker individually for the particular pulse train which it is tracking. As a result of this capability the tracker can be adaptive and its performance is limited only by the theoretical limits imposed by the input data. For example the ability to "flywheel" or coast through extended periods of missing pulses is limited only by the selected window width and the pulse-train source or threat instability. To combat the problems introduced by two pulse trains whose RF frequency and PRI differences are such that walk throughs can be expected several choices can be made. First, anytime two pulses are present within a prediction window, both pulses can be ignored and the tracker can coast until only one pulse falls in the window. The second approach is to give preference to the pulse closest to the center of the window or in the third case preference can be given to the pulse nearest the RF frequency to that predicted. Although some added circuits may be required in the tracker loop to allow a choice in discriminating criteria for each pulse train this additional cost is incurred only once to provide the capability for all tracker channels.

For N trackers the number of bits required in the track memory is the product of N by M where M is the sum of the word lengths for all of the different types of words required; i.e., RF, PRI, TOA and optimum loop gain and window width commands. Typically, there are two RPI's each requiring 28 bits; the TOA requires 28 bits; there are two RF's each requiring 16 bits; band select 5 bits; PRI gain 4 bits; TOA 4 bits; RF gain 4 bits; miss counter 4 bits; window width 4 bits; hit weight 4 bits; highest priority 1 bit; and miscellaneous 5 bits. The total number of bits is 151 which is equal to M. Typically n is 16. A total of 2416 bits is required. The address lines of this memory are driven by a counter synchronized by a master clock. At the output of the memory the status of the memory elements for each of the N trackers are delivered in timed succession.

As each trackers's data appears at the output of the memory, the difference TOA − W/2 is computed. The TOA is the TOA for the tracker at that instant under observation and W is the window width for this tracker. Each tracker is repeatedly, during each cycle or roll, whose duration is RO, scanned for a short interval. If the difference TOA − W/2 is positive, the window is not required to open before the status of this same tracker appears at the output of the track memory again. The last TOA number is then decremented by one roll and the difference is replaced in the appropriate memory address for this tracker. In its turn the output of the same tracker appears at the memory output during the next scanning cycle. This time the difference TOA − RO − W/2 is computed. If this difference is again positive, the difference TOA − 2RO is stored in the memory and outputted during the succeeding cycle and again evaluated. This process continues, with an additional RO being subtracted during each scanning cycle, until at the nth cycle TOA − nRO is negative. At this point the time of arrival predicted by the tracker under observation will occur before the data for this tracker is outputted. The new predicted TOA is added to the current estimate of PRI and stored in the appropriate address of the memory. This is our best open loop prediction as to TOA of the pulse after the one we are immediately concerned with. The track loop is interrogated to see if it is free to use; i.e., if window generator is busy or free. If it is not free the best TOA prediction has been made and no further action can be taken at this point. If the track loop is available, its use for the tracker involved is obtained.

The "name" of this tracker is stored in the tracker name latch, the time this tracker predicts is stored in the TOA latch, the receiver is tuned to this tracker's current RF frequency, and the window and TOA counters are started. At the end of the window more than one pulse may have been observed and for the time being the open-loop prediction made remains. At the end of the window if only one pulse has been observed, a correction is made, and the TOA counter contains the exact TOA error for the pulse.

In making this correction the window offset; i.e., the difference between the TOA and the center or zero of the window, is combined with the actual TOA in the window to produce an error signal. When the data for the tracker involved again appears at the memory output, the error is combined with the open loop TOA predictions to implement a phase correction, the error multiplied by appropriate gain (gain < 1) is added to the current estimate of PRI to generate the new current estimate of PRI. The output of an RF discrimination on the pulse under observation is added, with appropriate gain, to the current RF prediction to generate the new current RF prediction.

This completes the operation of the unit in the basic PRI track mode. The gain setting of the RF track loop is set as a function of stability on the one hand and the need to track sliding RF--(frequency modulated signal) on the other. Similarly, the gain of the PRI track loop is set as a function of sliding PRI's.

Typical functions demanded of the control of each tracker are presented in the following Table I:

TABLE I

| Status | Type |
| --- | --- |
| Unassigned | Jitter (PRI) |
| Acquisition | Stagger level number |
| Tentative track | Hopper frequency number |
| Track | |
| Loss of track | |

To track jittered pulses, the window may be lengthened in time. This is accomplished by setting a longer window time into the tracker involved. Thus, the initial set-up code for each tracker selects between normal operation and jitter tracking.

For staggered PRI's, one method is to store all the PRI's in depth in the track memory. The address pointer selects which PRI from the stagger file is to be used and is moved one place for each predicted pulse; that is, one PRI is added to the TOA at one attempt to open a window (TOA count down) and the other PRI is added to the TOA at the next attempt to open a window. For a two level stagger system first one PRI is used then the other. Each current PRI estimate is handled separately with both using the same TOA memory.

If RF hopper tracking is desired, the hopper frequencies are stored in depth in the track memory. The pointer in the hopper file is moved one place after a preset number of pulses have been missed. When the source jumps, it will continue to predict and look for the pulse at the old frequency until a preset number of pulses are missed. At this time the pointer will, while continuing to predict, start to look for the pulse at the next RF. If it has not found the pulse after looking at this frequency for the same number of predictions, it will move on again. This process continues until the pointer finds the pulse at one of its frequencies or until it accumulates enough missing pulses to go into the loss-of-track mode.

The control section is also used to acquire track. When the state of tracker is set to acquire, the tracker predicts and receives the track loop in a normal fashion. When in acquisition mode, the track loop is set open for a predetermined time (very long) or until a pulse is sensed. In case a pulse is not sensed before the time expires, the status of that tracker goes directly to loss of track. If a pulse is sensed, the predicted PRI is loaded, without correction, into the TOA memory and the status of the tracker involved is set to tentative track.

A tracker in tentative track mode operates normally with the exception that when a predetermined number (not large) of consecutive pulses have been missed it reverts to acquisition. When a different number of pulses (significant) have been correctly observed, the tracker switches to track. In track mode, the tracker involved counts consecutive missed pulses and after a large number reverts to loss of track. Both unassigned and loss of track status disables the particular tracker from making a prediction. Acquisition can also be achieved by simply loading in TOA if it is available.

The hit and miss count section of the memory is controlled by the status of the tracker and the presence or absence of a pulse in the predicted window. The count and status of a tracker is used as a basis for changes of status.

An important feature of a tracker is how long it will remain in synchronism when the input pulse train is not observed. This is usually summed up by stating that the tracker will track through 10 – 25 – 50 or some number of consecutive missing pulses.

Two properties of the tracker are important when determining how it will perform when pulses are not observed.

To what accuracy the average PRI has been measured before the missing pulses occur.

The ability of the tracker to predict subsequent pulse occurrences involving PRI and TOA loop predictions based on the measured average PRI.

In the completely digital tracker the arithmetic operations involving PRI and TOA can be carried to arbitrary accuracy. This means that the second required feature, that of predicting the measured PRI open loop, can be carried out to any accuracy desired. The measurement of the PRI then becomes the important quantity.

The predictions can be made to an accuracy leaving the measurement of the error the determining factor. If the arithmetic operation on PRI and TOA is carried to, say, 0.1 ns. and the error measurement is made to the nearest, say, 25 ns., the noise inserted into the error measurement, being of uniform distribution centered upon the correct error, is reduced by the gain ($<1$) of the loop. This means that the measured PRI can be of any accuracy desired by adjusting the loop gain and it is not necessary to measure anything with extreme accuracy in real time to flywheel for extended periods dependent only upon constraints imposed by the input signal.

The accuracy of the time measurement is greatly improved beyond the system clock by use of an averaging technique performed mathematically. The measurement derived from the clock and the calculated average when summed together provide a very accurate prediction of the occurrence of PRI. A typical tracker in accordance with this invention performs as if the system clock were 16 GHz.

When a tracker predicts a pulse it opens a sample window around the predicted time and observes pulses. In most trackers implemented to date, the window is considered successful, if, and only if, there was only one pulse observed in the window. In the case of threats that have narrowly separated PRI harmonics, the time taken for one PRI to "roll through" the prediction window of a tracker tracking the other PRI can be considerable. This loss of data can cause a tracker to lose track, possibly transferring to the other PRI.

To improve upon this difficulty, it is desirable to operate on windows that contain more than one pulse. The single pulse chosen, for the purpose of this example, is the one which occurs closest to the time predicted by the tracker. If the tracker is really tracking properly the pulse nearest the center should be correct and if for some reason it is not, the pulse nearest the center generates the smallest error, disturbing the track loop as little as practicable. This function is implemented as follows:

1. At the time the window is opened a negative number representing the time remaining before the pulse is expected at the zero of the window is incremented by single counts and loaded into a counter.

2. The counter now contains the negative of time left before the expected arrival of the pulse, and if allowed to run reaches zero at the exact time the pulse is expected. The number present in the counter at the time any pulse arrives is identically the time error, complete with sign, between the expected arrival time and the time of arrival of the pulse in question.

3. Every pulse that arrives while the number in the counter is still negative causes its error (the number in the counter at the time) to be loaded into the minus error latch. If more than one pulse arrives in the window before the predicted arrival time, (the zero of the window) only the error from the last negative pulse is remembered in the minus error latch.

4. The first positive error pulse which arrives has its error stored in the positive error latch. All pulses which arrive after the first positive error pulse are ignored.

5. At the end of the window there is in the minus error latch the error from the last negative pulse and in the positive error latch the error from the first positive error.

6. Now the two errors are added together algebraically with the sign of the sum selecting the smallest of the two to be used as the error signal if ($-$error) + ($+$error) is positive select ($-$error)
if ($-$error) + ($+$error) is negative select ($+$error)

As pointed out above in case of threats that have narrowly separated PRI harmonics, (PRI's that are multiples or submultiples of each other) the time taken for one PRI to roll through the prediction window of a tracker tracking the other PRI can be considerable. For example, if one PRI is 100 and the other 101, and the window is 20 units wide, there would be 20 consecutive windows in which both pulses would appear. If the receiver is allocated on a first come, first serve basis to requesting trackers then the number of observations missed by the tracker during a roll through becomes significant. The loss of data may indeed cause the shunted tracker to drop track or if the pulse trains are indistinguishable in RF, the tracker is likely to switch pulse trains.

The conclusion is reached that the tracker must not have receiver priority on a time basis, but priority should be determined by the number of pulses that the tracker has predicted without being processed from the receiver to a window to observe the pulses and thus generate an error.

Data sharing is accomplished in the following manner:

1. When each tracker requests a window (processor set to transmit the pulse corresponding to the tracker window from the receiver) it is assumed that the pulse will not be provided with a window and one is added to the number (priority number) of times it has been denied receiver access.

2. Any tracker requesting the window gets the window immediately if it is not in use. If in use, the requesting tracker's "priority number" is compared to the "priority number" of the tracker then assigned to the window. If the requesting tracker has a higher "priority number" the other tracker is bumped and the requesting tracker takes over. If the requesting tracker priority number is not greater than the priority number of the tracker then in possession of the window, the request is ignored.

3. When any tracker has successfully completed an observation and made error measurements, its priority number is set to 0.

Typical specifications for a tracker in accordance with this invention are shown in the following Table II:

TABLE II

| Number of Tracker Channels | 16 | (Each channel can track 2 level stagger, jitter, PRF sliding, 2 frequency hopping) |
|---|---|---|
| PRI Memories | 2 | (2 level stagger) |
| RF Memories | 2 | (2 frequency hopping) |
| Clock Rate | 40 MHz | |
| Track Loop Gain (TOA, PRI, RF) | $\frac{1}{2}R$ | $(0 \leq R \leq 7)$ |
| Window Width | 8μs to 64μs | (in 3μs steps) |
| ERROR Resolution | 25 nanoseconds | |
| PRI Measurement Accuracy | 0.8 nanoseconds | (Based on full PRI averaging) |

BRIEF DESCRIPTION OF THE DRAWINGS

For a better understanding of this invention, both as to its organization and as to its method of operation, together with additional objects and advantages thereof, reference is made to the following description taken in connection with the drawings, in which:

FIG. 1 is a block diagram illustrating the invention in its most rudimentary form;

FIG. 2 is a graph for explaining the operation of the apparatus illustrated in FIG. 1;

FIGS. 4, 5, 6, 7 and 8 are block diagrams showing cooperatively the functional components of apparatus in accordance with this invention and their cooperative relationship;

DETAILED DESCRIPTION OF THE INVENTION

Figure 3:
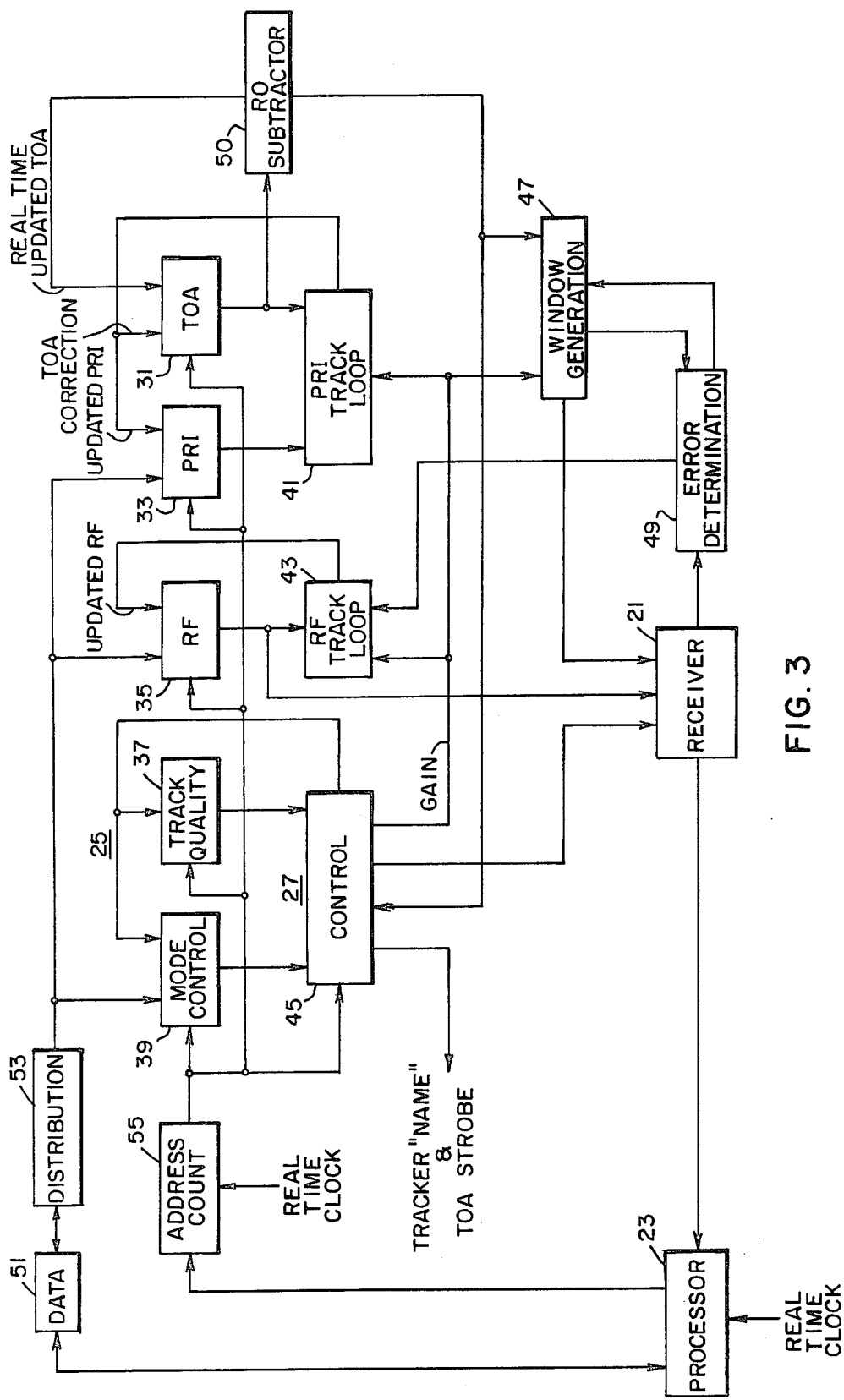
FIG. 3 is a block diagram showing the principal functional components of apparatus in accordance with this invention.
Figure 4:
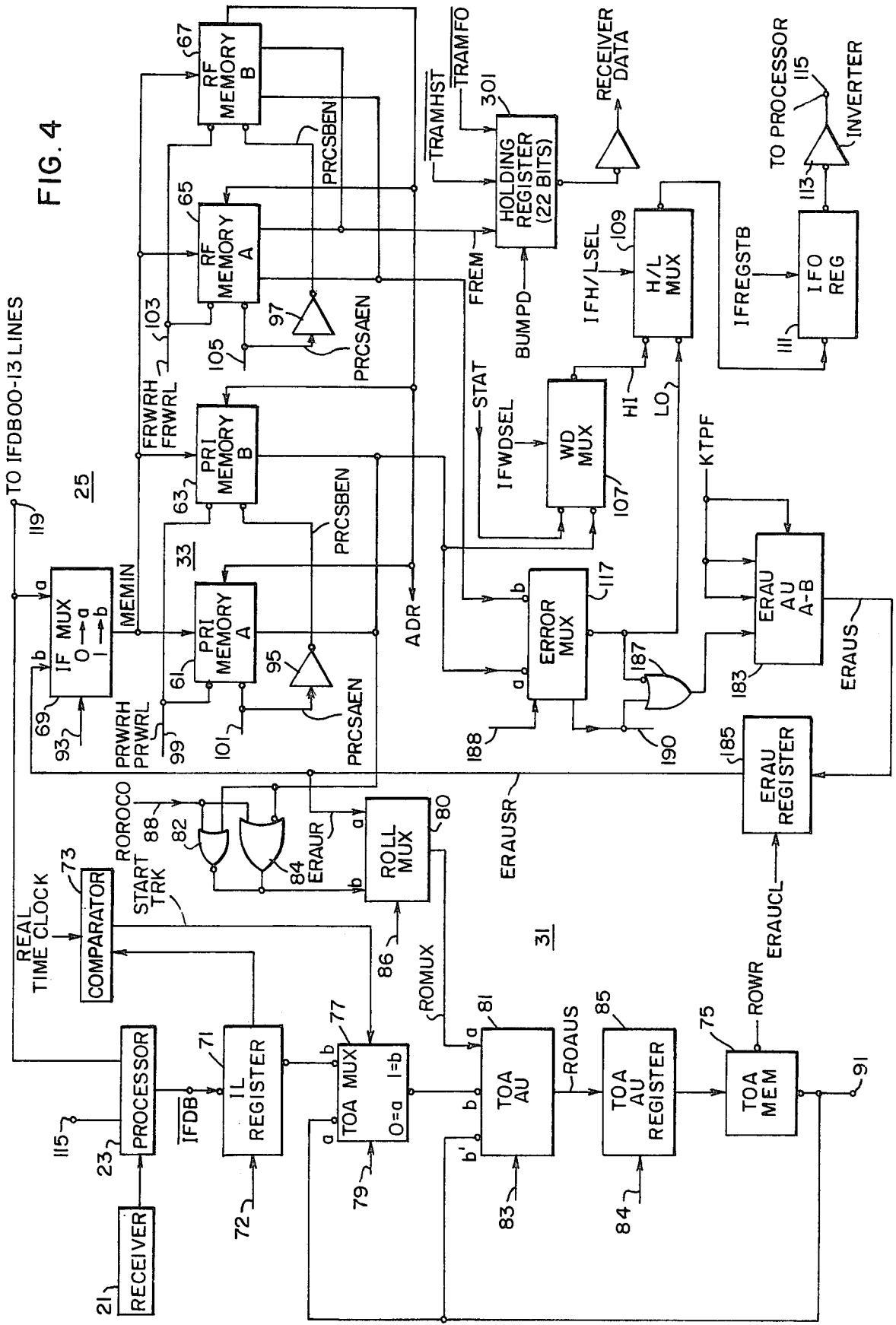

The apparatus represented in FIG. 1 includes a receiver 21, typically a counter-measures receiver, capable of scanning an area for threats represented by the block R1, R2, R3. The threats may produce signals of different types, for example, R1 may produce pulses of a given frequency, as represented by the dot-dash line labeled R1 of FIG. 2, and R2 a frequency-modulated signal as represented by the broken-line curve labeled R2 in FIG. 2.

To perform its functions the apparatus includes, as functional components which may be programmed into a computer, a processor 23 for processing the signals received by the receiver 21 and a track memory 25. The track memroy 25 carries the data on a plurality of threats at identifiable assigned addresses. Each address is referred to in this application as a tracker. There is also a track loop 27 for all trackers which cooperate with the processor 23 and the trackers to track the received signals. The track loop 27 includes multiplexers so that the signals are time-shared and are treated in timed succession to bring them into track. The track loop 27 also includes a window generator for generating windows for the respective trackers.

In FIG. 2, frequency is plotted vertically and time horizontally. The saw-tooth curve represents the frequency as a function of time, of reception sweeps to which receiver 21 is tuned. The frequency of reception varies cyclically from a lower limit to an upper limit. The available frequencies are digital so that the receiver sweeps through steps 22 as shown in circle II. The form of the signal received from threat R1 is shown enlarged in circle III. The receiver 21 receives trains of pulses R1 and during the short interval when the window is generated the frequency of reception of receiver 21 is snapped back by the tracker to R1 frequency. This train constitutes a sampling which serves for tracking. Each tracker produces a similar snap-back of the threat that it is tracking.

In FIG. 3 the track memory 25 is shown as including the TOA memory 31, the PRI memory 33, the RF memory 35, the track quality memory 37, and the mode control memory 39. Memories 31 through 39 contain the data for each of the trackers (typically 16 in number), each in an identifiable address. The track quality memory 37 stores an evaluation of tracker performance for each of the trackers that is based on how many pulses are formed as predicted; essentially the track quality memory stores the percentage of predictions that have been found to be correct. The mode control memory 39 records the character of the threats received; that is, whether they are simple signals at fixed PRI and frequency or PRI jitter signals or frequency hoppers. The track loop 27 includes the PRI track loop 41, the RF track loop 43, the control 45, the window generator 47, the error determination 49, the RO subtractor 50, the data register 51, the distribution 53 and the address count 55.

The processor 23 controls the flow of the intelligence on threats picked up by the receiver 21 to the data 51 whence it is distributed to appropriate addresses in the PRI 33, RF 35, mode control 39. The flow of intelligence to the trackers is multiplexed, the injection of data at the appropriate addresses being controlled by the address count 55. The address 55 to be accessed also derives its intelligence from the processor 23. The address count is driven from a counter synchronized with a real time clock (not shown).

The PRI track loop 41 derives data from the TOA 31 and the PRI 33 and feeds back modified and corrected data to the TOA and PRI. There is also feedback from the TOA 31 through the RO subtractor 50. The RO subtractor 50 subtracts one roll per cycle from a current TOA to produce a new TOA. A roll is the time taken to scan through all trackers of the track memory 25.

The details of the invention and its operation will now be described with reference to FIGS. 4 through 11b. The references to the number of bits involved in the certain functions are included for the purpose of aiding the practice of this invention and not with any intention of in any way restricting the scope of this invention. The description will deal first with the digital trackers.

With reference to FIGS. 4 through 8, the computer components for performing the various functions are represented by appropriately labeled blocks with lines between the blocks having arrows which indicate the flow of intelligence. Small circles at the ends of the line indicate an inversion, i.e., the 1's are inverted to 0's and the 0's to 1's. Larger circles with an X in the center indicate connections to the receiver 21. Larger circles without an X indicate connections internal to the tracker. Throughout, the connections between the functional components are represented by single lines. In fact, these single lines represent a multiplicity of lines.

Labelling AU in a block means arithmetic unit where the computation corresponding to the label is carried out. TOA AU refers to the block in which the TOA subtractions are carried out. The label MEM means memory; thus, TOA MEM means the TOA memory. The label MUX means multiplexer.

Typically the track memory 25 is digital and is mechanically packaged in nine general purpose (wire wrap) Augat boards, which are mounted in a general purpose Augat rack and utilize approximately 270 Schotky Gates and multisubstrate integrated networks. The track memory 25 typically carries the data of 16 individual trackers. Typically, the track memory 25, has the capability of handling dual PRI's, recorded in PRI-memory A 61 or PRI-memory B 63 (28 bits each) where the LSB (least significant bit) is $0.13 \times 10^{-9}$ seconds and the MSB (most significant bit) $26 \times 10^{-3}$ seconds. Each tracker is capable of handling dual frequencies, recorded in RF-memory A 65 or Rf-memory B 67, (16 bits each) where the LSB = 0.2 megahertz and the MSB $7.5 \times 10^9$ Hz.

Data is inputted out outputted from the processor 23 typically by two 16-bit data busses and a 4-bit major and a 4-bit minor address bus. The 4-bit major-address bus determines the track memory number assigned and the 4-bit minor-address bus determines the word within the track memory number which is being accessed such as PRI A or B, FREQ A or B, TOA, PRI or FREQ GAINS, etc. The data is inputted through the 16-bit data-input bus. At the start of an operation the processor removes all data from the track memory 25 and assures that the trackers are not tracking.

When a tracker of the track memory 25 is to be "set on" to a threat, the threat characteristics, PRI, RF, are inputted via the data bus. Then tracker quality information is given to the tracker; this includes window width, receiver set-up time, (FREQ, TOA, PRI) GAINS, and HIT WEIGHT. All of this data is programmable for each separate tracker. Each of the 16 tracker address is typically scanned and is available for an interval 0.2 μ sec. every 3.2 μ sec. which is equal to 1 roll. The input data and addresses are stored in a combined register and multiplexer IF MUX 69 on the trailing edge of a write strobe from the processor 23, then, one by one, written into memory 25 when each tracker rolls through the proper address.

After all of the pertinent data has been inputted by the processor 23, the processor 23 sends an initial TOA for an appropriate one of the trackers to an accuracy of ½ roll, which is the time when the next pulse or threat is expected, to input-load (IL) register 71. The comparator 73 compares this time to the real time clock. The IL register is enabled by a write signal on terminal 72. When the initial TOA under observation equals the time in the real time clock to an accuracy of 2 rolls, the initial TOA residue (2 rolls → ¼ roll) is added to PRI and loaded into the TOA memory 75. Also at the same time the tracker "ON" bit (START TKR) is set and this allows windows and correction to be generated within the tracking apparatus.

The processor 23 starts the initial TOA loading 2 rolls to ¼ roll before the arrival of each pulse signal is expected. For example, the initial TOA for a pulse signal is at real time 1001. When the real time clock registers 1000 the processor starts. The 1001 is then compared in the comparator 73 to the real time and the difference 0001 is transmitted to the TOA multiplexer, TOA MUX, 77, when the upper three bits are equal. A 1 is at this instant impressed on the selector terminal 70 (from the processor 23) of TOA-MUX 77 so that the data flows in through terminal b. The data is inverted. The TOA-MUX 77 multiplexes the data into the TOA MEM 75 for the different trackers. Since only the TOA residue (0001) is transmitted, only the lower significant bits (typically 0 through 15 for 28 bits) are used. The data from TOA MUX 77 is multiplexed into the TOA arithmetic unit TOA AU 81 where the TOA computations are carried out. This unit is set on 1 selector 83 so that terminals $b$ and $b^1$ are active. From TOA AU 81 the data flows to TOA AU REGISTER 85 when an enable signal is received in terminal 84 and is stored in TOA MEM 75 whence the data is derived for computation through terminal 81 (see FIG. 4). Bits 16 through 28 are reinserted at terminal $b^1$ inverted; i.e., as a series of 1's. The data from TOA MEM 75 is also fed back to TOA MUX 77 through terminal $a$, when selector 79 is set on 0, for further computation.

Each TOA rolls through its appropriate address of the track memory, once typically every 3.2 μ sec., for an interval of 0.2 μ sec. For this typical situation 3.2 μ sec. equals 1 roll. Each time an address comes up, its TOA (i.e., the new TOA value at the instant it comes up) is compared to ½ its window width (W/2) + receiver set-up times (S), to a resolution of 1 roll. If the TOA > W/2 + S, then 1 roll is subtracted in TOA AU 81 from the old TOA and the difference (the new TOA) loaded back into TOA MEM 75 at the end of the address. The process is continued until TOA < W/2 + S. At this time (called a tracker THERE), the difference between the TOA and the real time middle or zero of the window which is called the TOA residue is added to the PRI and loaded back into TOA MEM 75 as the next open loop prediction for the tracker involved. This TOA residue should be distinguished from the initial TOA residue derived from the IL REGISTER 71 which is sometimes called here the initial residue. Also at a "THERE" the TOA residue is loaded into window generator. Then, the S (rec DLY) is counted down to zero. At this time the window for the receiver is opened for W/2 + RESIDUE + W/2 + W + Difference.

The data for computing the new TOA's is derived for each tracker through ROLL MUX 80. When a 0 is impressed on command terminal 86, terminal b of ROLL MUX 80 is enabled and ROLL MUX 80 receives rolls or PRI data from the OR's 82 or 84. When a 1 is impressed on ROROCO terminal 88, one roll passes into ROLL MUX 80. ROLL MUX 80 multiplexes the roll into TOA AU 81, through terminal a of unit 81 and 1 RO is subtracted from the current TOA. With a 0 on terminal 88 the appropriate PRI is passed into ROLL MUX 80. Each PRI is multiplexed into TOA AU 81 where it is added to the corresponding last TOA at the proper instant. The OR's 82 and 84 symbolically represent complex assemblies of OR's. The connections of the OR's to ROLL MUX 80 and to each other are functional and not electrical.

OR 82 passes the bit which corresponds to the one roll weight, the other bits, of 28 bits for example, are inserted through the OR 84. The total number inserted at (b) is equal to one roll. Since the TOA is formed of 28 bits typically, the OR's 82 and 84 must provide 28 bits for subtraction although the roll is always the same magnitude, 3.2 microseconds typically.

During the time, when the window is open, the tracker determines the time of arrival of each pulse from the receiver with respect to the middle of the window typically to within 25 nanoseconds.

This operation is illustrated in FIGS. 10a through d. In all graphs the same real time is plotted horizontally, intersections of the same vertical line with the horizontal axes representing the same real time. In graphs 10a and 10b magnitude is plotted vertically. In graph 10a the windows W are shown above the axis and in graph 10b the pulses P of one train are shown above the axis. In FIG. 10c the TOA magnitude is plotted vertically. The heavy broken line above the time axis T is spaced a distance W/2 above this axis. In the interest of simplifying the explanation the start-up time S of the receiver is neglected. In plot 10d the PRI is plotted vertically.

The saw-tooth wave SW in FIG. 10c represents the decrementing of the TOA successively by 1 roll. The wave SW is not a smooth line but a stepped line as shown in circle IV. Each step represents 1 roll. The height of each step is equal to one roll so that on each step the TOA is reduced by 1 roll. When the wave SW intersects the broken line, TOA $\leq$ W/2, and PRI is added to the last TOA starting a new decrementing of TOA. In addition a counter counts down to the center of the window; that is, it counts down to 0. The counts are clock counts; each count may for example be a nanosecond. This determines the predicted time of arrival PTOA of the pulse. The time between PTOA, the zero or middle of the window, and the leading edge of the actual pulse P is the error in TOA. The gain, a power of ½, is multiplied by this error and the product added to the TOA decrement as shown by the lines GE in FIG. 10c. Correction is also made in the PRI as shown by the lines GPRI.

The graphs in FIGS. 10a-d are for a single threat. Actually the operation involves a plurality of threat typically 16. FIGS. 11a and b are graphs VI, VII, and VIII illustrating the operation for three threats. In FIGS. 11a and 11b real time is plotted horizontally. In FIG. 11a a magnitude is plotted vertically and in FIG. 11b TOA is plotted vertically. The saw-tooth broken lines SW6, SW7, SW8 are actually stepped rather than smooth but are shown smooth in the interest of clarity. The heavy short lines represent the successive pulses of the threats to which curves VI, VII and VIII correspond. As indicated in the left-hand lower corner of FIG. 11b, a cycle of pulses are produced during 1 roll. It is assumed that the pulses represented on curves VI, VII and VIII are the first three pulses of the cycle. As shown in FIG. 11b, the TOA and the PRI are different for the three threats.

To illustrate the operation of the apparatus assume that the real TOA is 312 and that the tracking is started at 300. The initial residue is 312 − 300 = 12. Assume that the PRI is 100 and that the window is 30 in duration so that W/2 = 15. Assume that S = 5. Assume that 1 roll = 6. At the start TOA = 12 + 100 = 112; W/2 + S = 20; 112 > W/2 + S. Subtracting 1 RO, the new TOA = 106; 106 > W/2 + S. One roll is then subtracted repeatedly. After a number of decrements the new TOA = 28. The next TOA is 22 and the next 16. At this point TOA $\leq$ W/2 + S and a THERE is produced. Now PRI is added and a new cycle starts with TOA = 118.

The selection of one of a number of threats whose pulses appear simultaneously in a window will now be described. For every new pulse in the negative part of the window (W/2) the time from T=O, the center or middle of the window, is loaded into a register and held. Once T=O has occurred the first pulse in the positive part of the window stops the count and terminates the window, simultaneously. If there are not any pulses in the positive portion, then the window is stopped when + W/2 is counted down to zero. Once the window has been stopped, the magnitude of the departure from the center of the window of the last pulse in the − W/2 part of the window is compared with the magnitude of the departure from the center of the window of the first pulse in the + W/2 part of the window and the time which is closest to T=O (the middle of the window) is used as the error to be corrected. If there is only one pulse in the window, its departure from the center of the window is used as the error. Now that the error has been determined, the sign and magnitude of the error and tracker number is loaded into error correction cirucuiry. At which time another window can be generated.

The PRI and RF data is transmitted from the processor 23 (FIG. 4) on appropriate command (O), from the processor 23, on terminal 93 of the IF MUX 69. The data is transmitted through terminal a of IF MUX 69 to the PRI memories 61 and 63 and the RF memories 65 and 67. The memories 61 and 63 and 65 and 67 respectively are interconnected through inverters 95 and 97 so that only one of each pair can receive data at any instant as determined by the commands on selector terminals 99 and 101 and 103 and 105. The PRI is transmitted through word multiplexer WD MUX 017, high-low multiplexer H/L MUX 109, IFO register 111 and inverter 113 to terminal 115 whence it is returned to the processor 23 for verification and further processing. The Rf flows through ERROR MUX 117, H/L MUX 109, IFO register 11, inverter 113 to terminal 115.

The processor 23 is also connected through terminal 119 and through inverter 131 (FIG. 5) to the network (FIG. 5) for evaluating the real time and error in the TOA.

The processor 23 supplies intelligence as to the gains through terminal 119 and inverter 131 to TOA GAIN MEM 133, PRI GAIN MEM 135, and RF GAIN MEM 137. Intelligence as to W/2 + s is also supplied to W/2 + S MEM 139 through inverter 131. Both as to the gain and as to the W/2 + S the intelligence is coordinated with the roll address (ROADR) impressed in terminal 140 and with the word select (WOSEL) impressed in terminal 142 as indicated.

The data is memory 139 is impressed through terminal 150 and compared in COMPARATOR 141, for each tracker in track memory 25 during its turn in a roll, with the corresponding TOA from TOA MEM 75. The intelligence from TOA MEM 75 is inserted through terminal 91. An AND 143 signals THERE when its input terminals are supplied respectively with TRK ON, TOA, and W/2 + S ≦ TOA.

Figure 14:
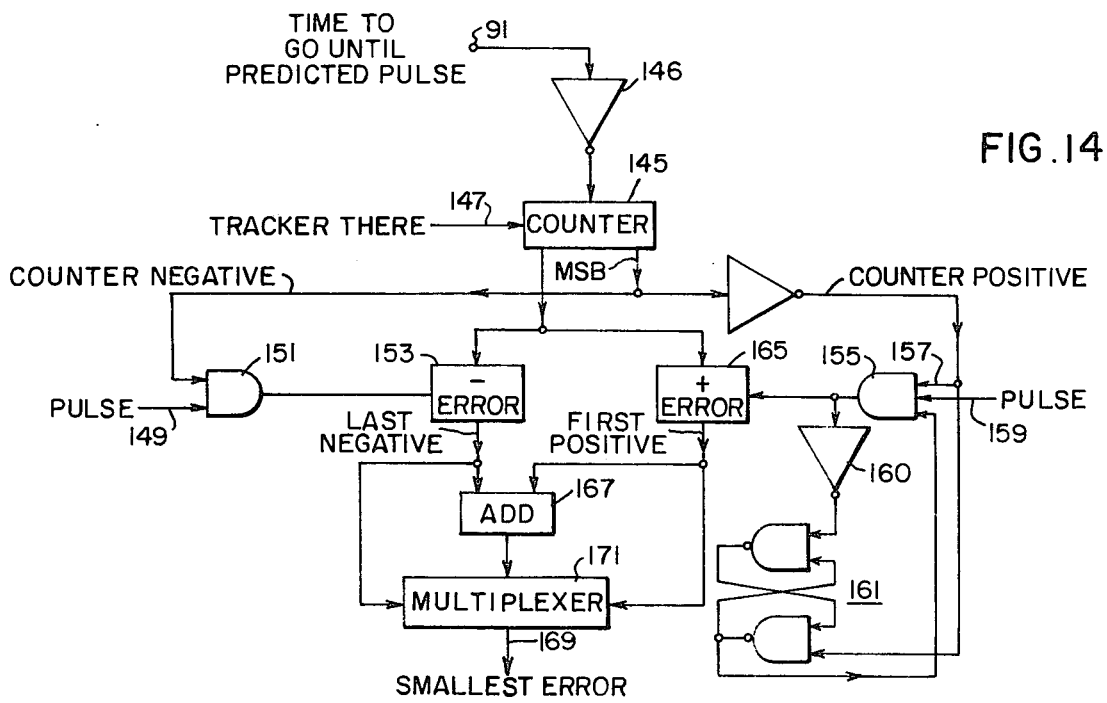
FIG. 14 is a fragmental block diagram showing how one of a plurality of pulses is selected for a window in the practice of this invention.

A component of FIG. 5 is shown in FIG. 14. FIG. 14 includes a counter 145 timed by the real time clock. The counter 145 is supplied from terminal 91 through inverter 146 with the TOA's. It is enabled at any instant on the impressing of a THERE on terminal 147 and counts the TOA residues of pulses which occur simultaneously in a window. On the impressing of the pulse being tracked on terminal 149 of AND 151, the counter 145 determines the negative error for each pulse in the window. The negative error for the last negative pulse is stored in −ERROR register 153. The first positive error is transmitted through AND 155 when the corresponding pulse is impressed on its terminal 157 and terminal 159 has an enabling signal from flip-flop 161. Once the first positive error is passed by AND 155, flip-flop 161 is flopped through inverter 160 and AND 155 is disabled.

The positive error is stored in +ERROR register 165. The errors from registers 153 and 165 are added to algebraically in ADD 167 and the smallest error with its polarity (sign) is transmitted through terminal 169 of MULTIPLEXER 171.

While the pulse-selecting apparatus shown in FIG. 14 and the practice involved in this apparatus has unique applicability to the tracking apparatus disclosed in this application, it also has general applicability and can be used with trackers of other types. For example, it can be used with separate tracker and control-loop apparatus in accordance with the teachings of the prior art.

The gains from memories 133, 135, 137 (FIG. 5) are transmitted to a properly enable GAIN SHIFT CONTROLS + ERROR FLAG CONTROLS 173 and thence to shifters 175 which are properly enabled from the processor 23 through terminals 177, 179, 181. Each minimum error and its polarity are also impressed on shifters 175 and the errors with appropriate gains; that is the corrections, are transmitted through terminal KTPF.

The corrections of the assigned polarity on KTPF (FIG. 4) passes through ERROR AU A-B 183 (FIG. 4) into ER AU REGISTER 185. For the TOA correction one roll is subtracted from the TOA as corrected. This roll is inserted through OR 187. The error in the PRI and RF (see FIG. 10) are multiplexed through the ERROR MUX 117 and also pass into ERROR AU A-B 183 and thence into ER AU REGISTER 185. This error data is transmitted through OR 187 which represents a plurality of OR's similar to OR's 82 and 84 to achieve the proper selection out of the multiplexer 117. The OR's 187 provide 28 bits so that the roll may be subtracted from the TOA at 28 bits. With a 1 on terminal 190, OR 187 passes 1 roll; with a 0 on terminal 190, OR 187 passes the output of multiplexer 117 which includes PRI or RF selected at appropriate times.

With a 0 on terminal 188, terminal a of ROLL MUX 80 is enabled and the TOA correction from ER AU REGISTER 185 is multiplexed through multiplexer 80 into TOA AU 81 and thence to effect the necessary correction through ER AU REGISTER 185 and line ER AU ER. Since terminal b of multiplexer 80 is at this time disabled, the roll which is to be subtracted from the TOA correction, cannot be derived from OR's 82 and 84. It is for this reason that the roll is inserted through OR 187. With IF MUX 69 set at b (by a 1 on terminal 93) the PRI and RF corrections from ER AU REGISTER 85 are multiplexed through multiplexer 69 to correct the PRI and RF.

Figure 12:
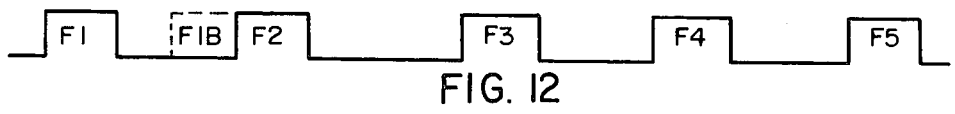
FIG. 12 is a fragmental block diagram showing the manner in which the TOA is corrected.

The error correction cycle typically takes five rolls to complete. The cycle starts when the first tracker address is the tracker being corrected and ends at the fifth comparison. FIG. 12 shows the steps in the correction cycle and Table 111 describes these steps:

TABLE III

| Step | Function |
|---|---|
| 1 | TφA GAIN ($G_T$) LOADED |
| 1-1B | K Shifted by $G_{TOA}(G_T)$ |
| 1B | $G_T K$ - 1 roll |
| 2 | $G_T K$ - 1 roll added algebraically to TφA Memory & PRI Gain Loaded |
| 2-3 | K shifted by $G_{PRI}(G_P)$ |
| 3 | $G_P K$ added algebraically to PRI Memory |
| 4 | RF GAIN LOADED |
| 4-5 | $K_F$ SHIFTED BY $G_{RF}$ |
| 5 | $G_F K_F$ ADDED ALGEBRAICALLY TO RF MEMORY |

Figure 10:
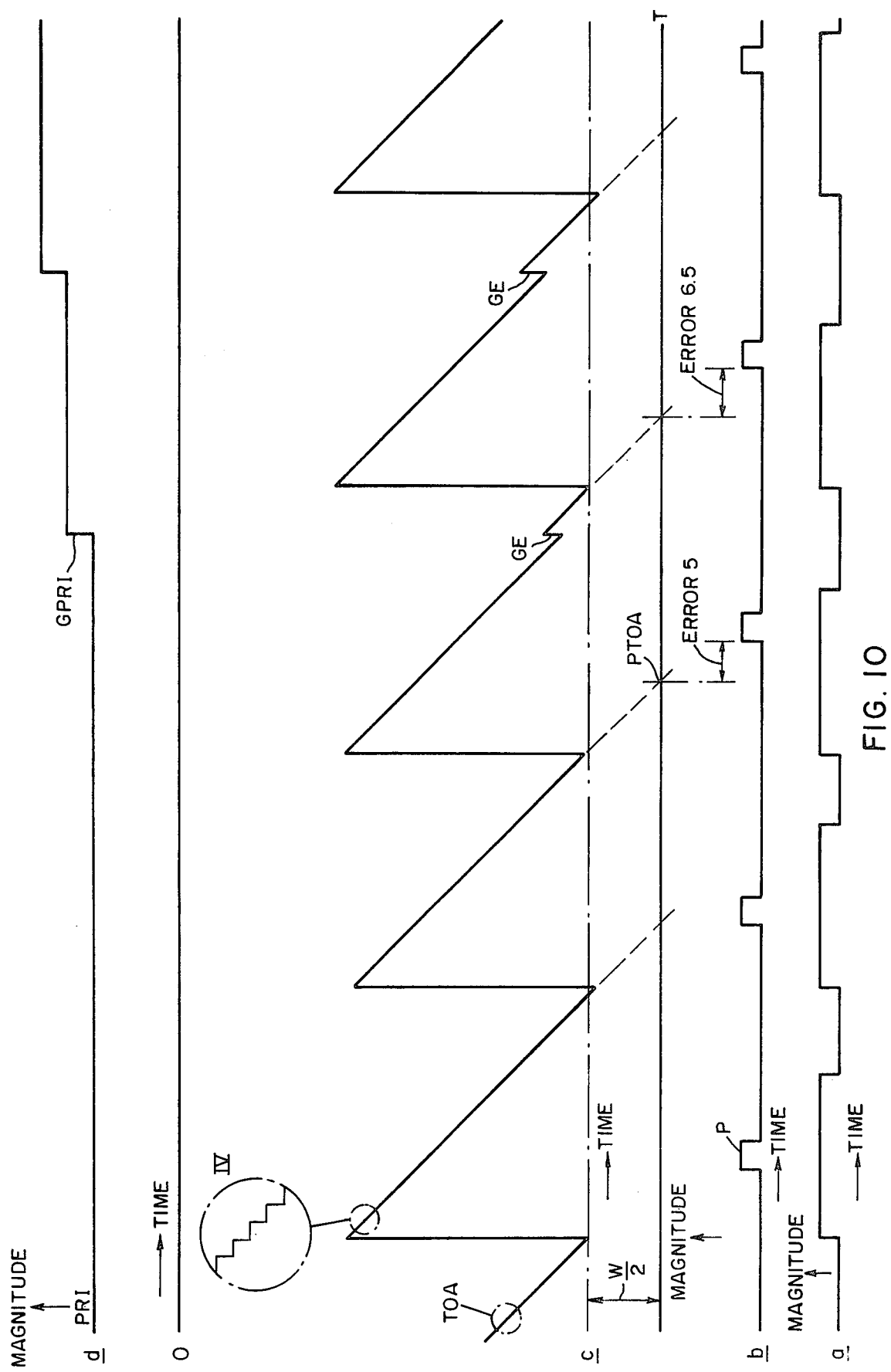
FIGS. 10a through d and 11a and b are graphs illustrating the operating of FIGS. 3 through 8. Points on the graphs of FIGS. 10a through d and the graphs of FIGS. 11a and b which lie along a common vertical line represent the same instant of real time.
Figure 11:
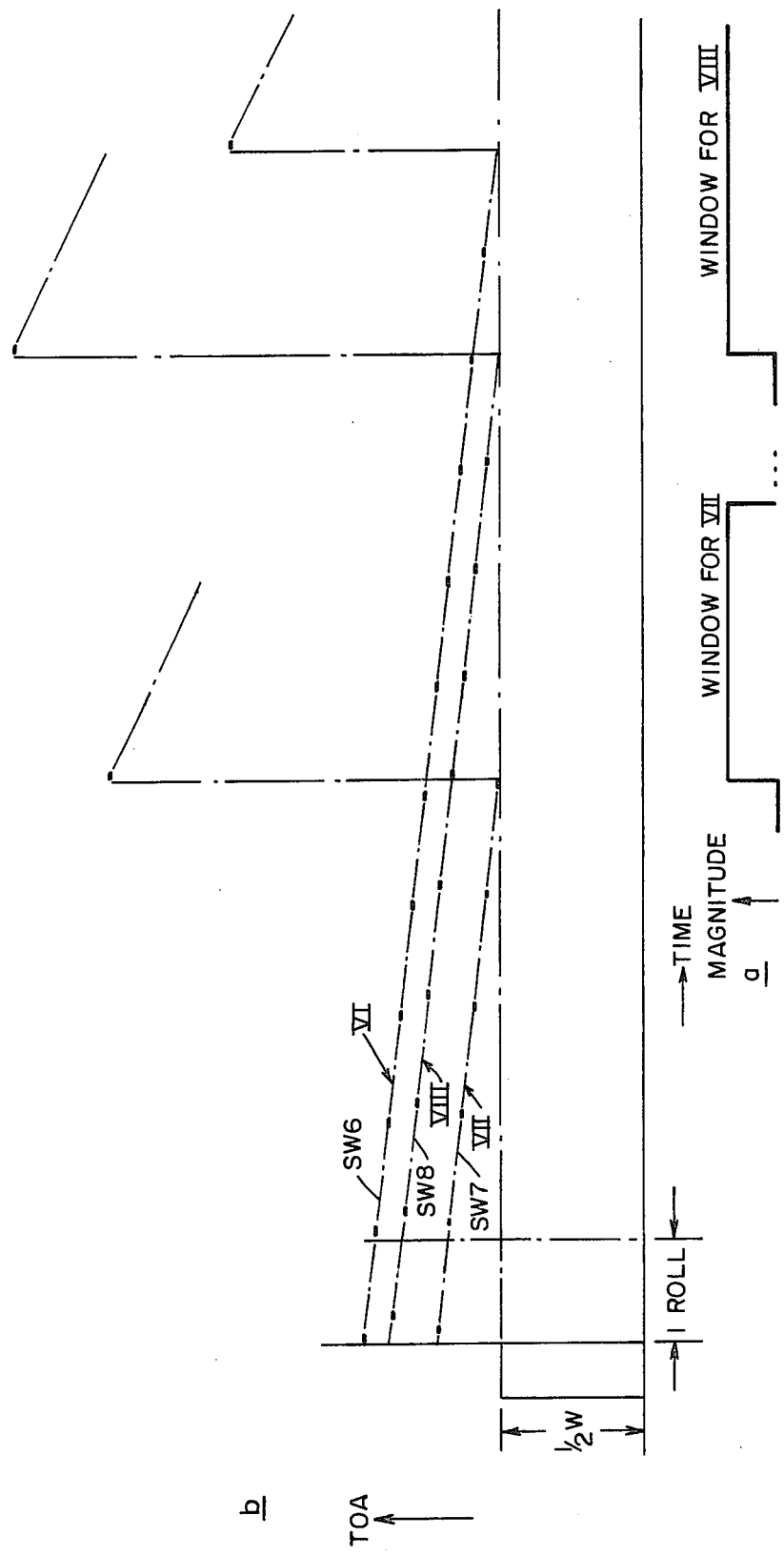

Steps 4 and 5 of Table 111 are only carried out if there is only one pulse in the window and if the $K_F$ (RF CORR) is received from the receiver. The correction operation is shown in FIG. 10.

Part of the input data that must be defined for a tracker are the dual PRI and RF. A dual PRI is handled within the tracker as follows. Upon initial start-up, PRI A is loaded into the TOA loop, as described previously, when the first THERE occurs PRI B is loaded into the TOA and when the next THERE occurs PRI A is loaded into the TOA loop. Thus, every other open loop prediction serves for PRI A then B alternately.

Dual frequency is handled differently in that RF A data is used for every new prediction until FALL OFF ($F_O$) occurs, which happens when 32 windows have been opened without any hit. Hit Weight (HT WT) is a preprogrammable number from 0 to 31 which is subtracted from the sum of no hits every time there is a hit or a pulse found in the window.

Once $F_0$ occurs RF B is used for the prediction until the $F_0$ flag drops out and returns again whereupon, RF A is used or when the number misses accumulated is 256 at which point the tracker is automatically turned off.

If two or more trackers should happen to want the window at the same time, a priority comparison is made to determine which tracker should have the window. The priority circuit operates as follows. Everytime a "THERE" occurs, the priority count is incremented by +1 if a window is granted and completed, then at the end of the window the priority count is set to ZERO. But if the window was not completed (the tracker is BUMPED OUT) the count stay the same until the next "THERE" when it is incremented by +1 again. If two trackers want the window, their priority counts are compared and the larger priority is given the window and its priority is stored for comparison to other tracker priorities. At the completion of a window, the window priority is set to zero so that the next tracker, which wants the window, gets it.

The holding register (FIG. 4) holds the RF and miscellaneous bits required to tune the receiver for the duration of a window for each window opening. This data is during this duration transmitted to the receiver.

Once a window times out or is terminated on selection of a positive or negative pulse as disclosed with reference to FIG. 14, another window for another tracker can be generated even while the error correction of the preceding tracker takes place. The window generator 47 is signaled through the priority-clear logic 303 (FIG. 6) that it is free to generate another window. This is accomplished by clearing the priority-register 305 (FIG. 7) through terminals 308 and 310.

The apparatus shown in FIG. 7 determines if a new tracker is to replace or BUMP a tracker that at a particular time has a window. The address of the new tracker is clocked in at terminal 306 through terminal 308 into holding register 309. Terminal 311 coordinates the address of the new tracker with the apparatus shown in FIG. 5 which computes the correction. The address from terminal 311 is inserted through terminal 181 into gain shift control and flag control 173.

Initially the priority for the tracker that has control of the window, the old priority, is in priority register 305. The priority number for the new tracker, the new priority, derived from line 313 through inverter 315, is inserted in the BUMP comparator logic 319 through terminal 321 when the THERE occurs (terminal 322). The priority of the tracker that has the window is also inserted into the comparator 319 through terminal 323. If the new priority is higher than the old priority, a signal is delivered through terminals 325 and 306 and 317 and the new priority is clocked into the priority register 305 by lines 306 and 317 in place of the old priority.

Figure 8:
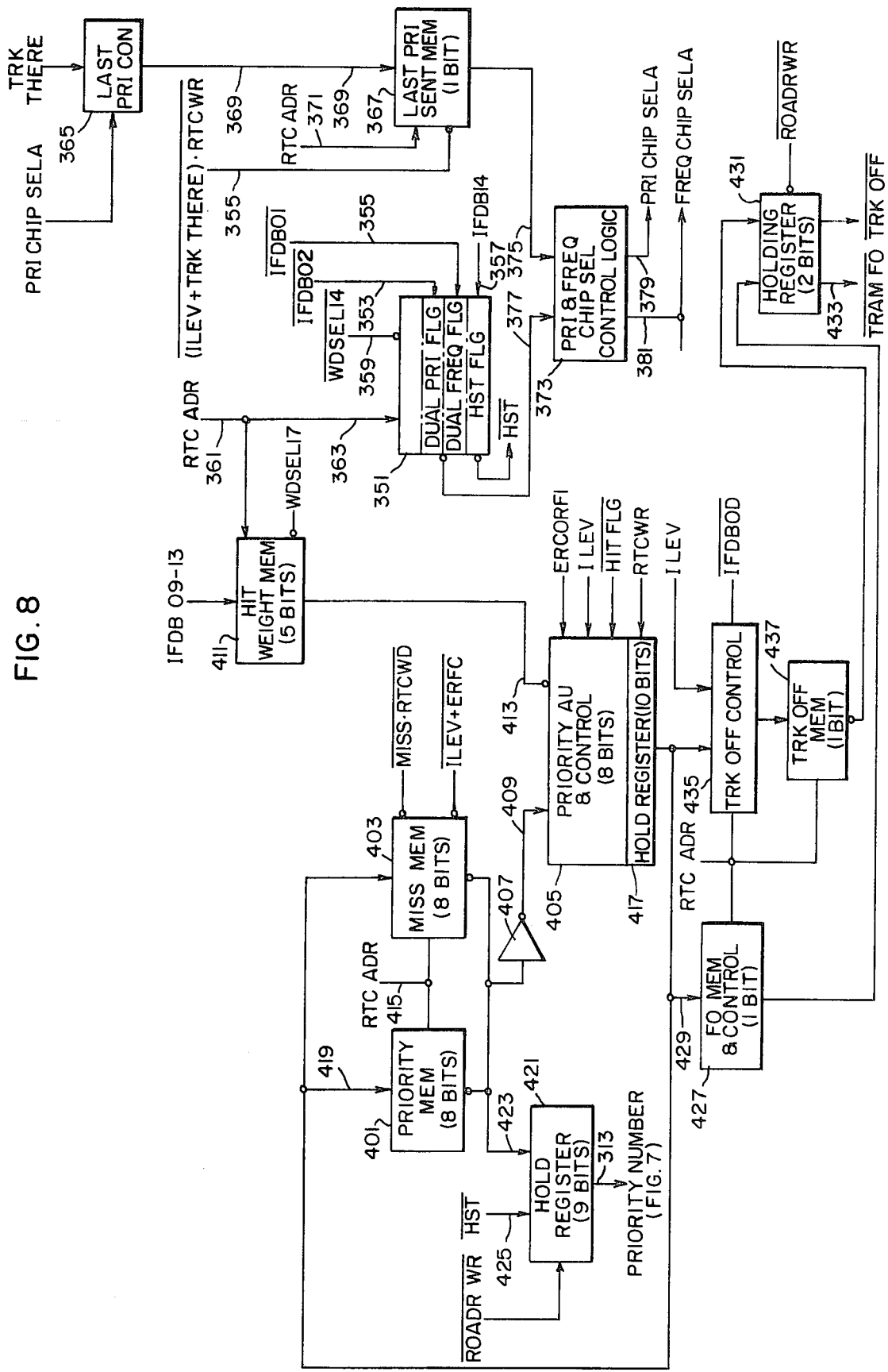

The apparatus shown in FIG. 8 has the following functions:

1. It controls when a tracker is turned on or off.
2. In the case of dual frequency or dual PRI threats, it determines which frequency or which PRI is to be processed at any instant.
3. It controls when a tracker is to be shut down because the tracker has an excessive number of misses typically 256.
4. It determines the priority of a tracker (FIG. 7) based on the number of times the tracker has unsuccessfully sought a window.
5. It also sets a highest or overriding priority for a tracker.

This apparatus includes a memory 351 in which flags are set for each tracker, through terminals 353, 355, 357 respectively, indicating dual PRI, dual RF, and overriding priority. The flags are set on signals through terminal 359. The real-time-clock address for the corresponding trackers in turn is derived from line 361 and inserted through terminal 363. The real-time-clock address starts and ends a short interval, typically 50 ns, before the roll address. This time is necessary to carry out certain preliminary operations such as, priority determination, dual mode determination, etc.

The apparatus shown in FIG. 8 serves, in the case of dual PRI, to alternate the PRI's, first PRI-A and then PRI-B. On the occurrence of a THERE in the last PRI control 365, the last PRI is inserted in last PRI memory 367 at terminal 369 together with the real-time-clock address inserted at terminal 371. This intelligence is inserted in control logic 373 through terminal 375. The control logic 373 also receives the intelligence that there are dual PRI and dual RF in terminal 377. The control logic 373 sends out the intelligence to select the alternate PRI next, through terminal 379. At the other terminal 381, the control logic 373 sends out the intelligence that if the tracker involved misses in one frequency, say RF-A, to select the other RF-B.

The apparatus shown in FIG. 8 also includes a priority memory 401, a miss memory 403, and an arithmetic unit 405 for computation of priority and miss status. Priority data and miss data is inserted at different times into the arithmetic unit 405 from memories 401 and 403 through inverter 407 and terminal 409. The hit weight is also inserted in arithmetic unit 405 from hit-weight memory 411 through terminal 413. The hit-weight is a number assigned by the processor 23 to each tracker to control the quality and arithmetic shut down based on a percentage of misses to hits in a window. Memories 401, 403, and 411 are accessed by the real-time-clock addresses through lines 415 and 361.

Figure 9A:
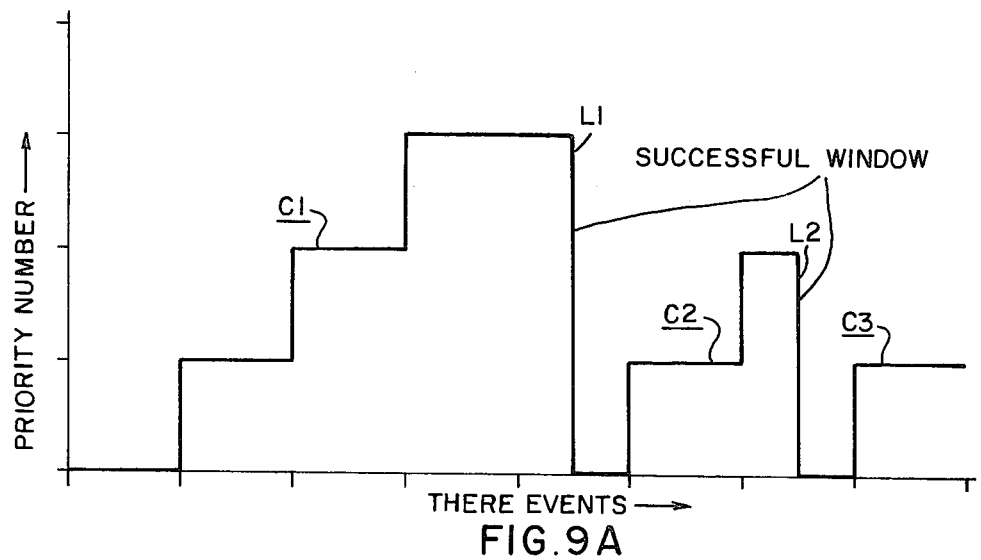
FIG. 9A is a graph illustrating the operation of the priority control shown in FIG. 8.

The priority operation is illustrated in FIG. 9A. Priority number is plotted vertically and THERE events horizontally. FIG. 9A corresponds to one tracker; such a graph may be plotted for each tracker.

On the occurence of a THERE, 1 is added to the priority number as illustrated in the left-hand portions of curves C1, C2, C3. When the tracker corresponding to FIG. 9A receives and completes a window, the priority number drops to 0 as shown by the lines L1 and L2 of curves C1 and C2. The arithmetic unit 405 (FIG. 8) includes a hold register 417 which holds the latest priority calculaton, a number or 0, for the tracker whose address is being accessed and loads this latest priority back into the memory through terminal 419 at the proper instant. For every new tracker address the priority number and highest flag is loaded into holding register 421 through terminals 423 and 425 for use in the apparatus shown in FIG. 7.

Figure 9B:
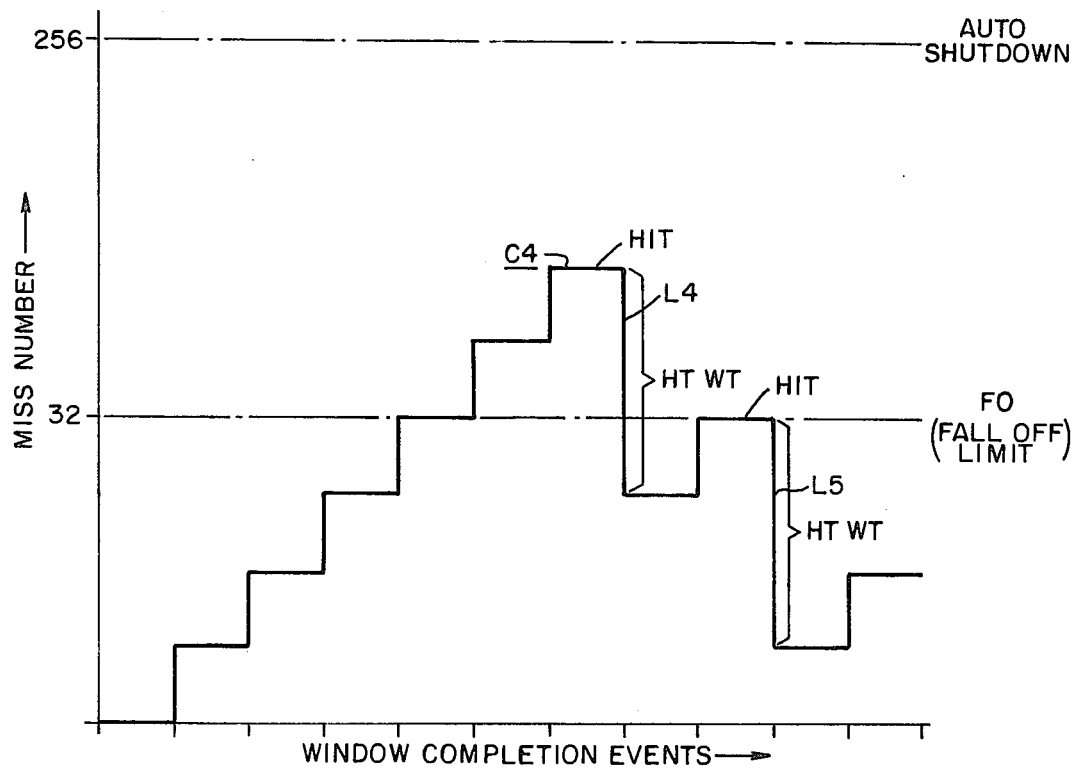
FIG. 9B is a graph illustrating the miss function of the apparatus shown in FIG. 8.

The miss operation is illustrated in FIG. 9B in which window completion events are plotted horizontally and miss number vertically. FIG. 9B corresponds to one tracker. At the completion of a window, there is a determination if there was a hit in the window, if not, 1 is added to the miss count or miss number as shown by the lefthand portion of curve C4. If the miss count exceeds 32 typically a fall off (FO) flag is set in the FO memory and control 427 from hold register 417 through terminal 429. The intelligence as to the FO flag passes through the holding register 431 and from its terminal 433 to the processor 23 providing lack-of-quality of track information. If the miss number rises to 256 typically, the tracker is turned off through the tracker-off control 435 and the tracker-off memory 437. The tracker-off memory retains the intelligence that the particular tracker is turned off and prevents any futher window generation for the particular tracker.

If a hit does occur, the hit-weight is subtracted from the miss number as shown by the vertical lines L4 and L5 in FIG. 9B.

Figure 13:
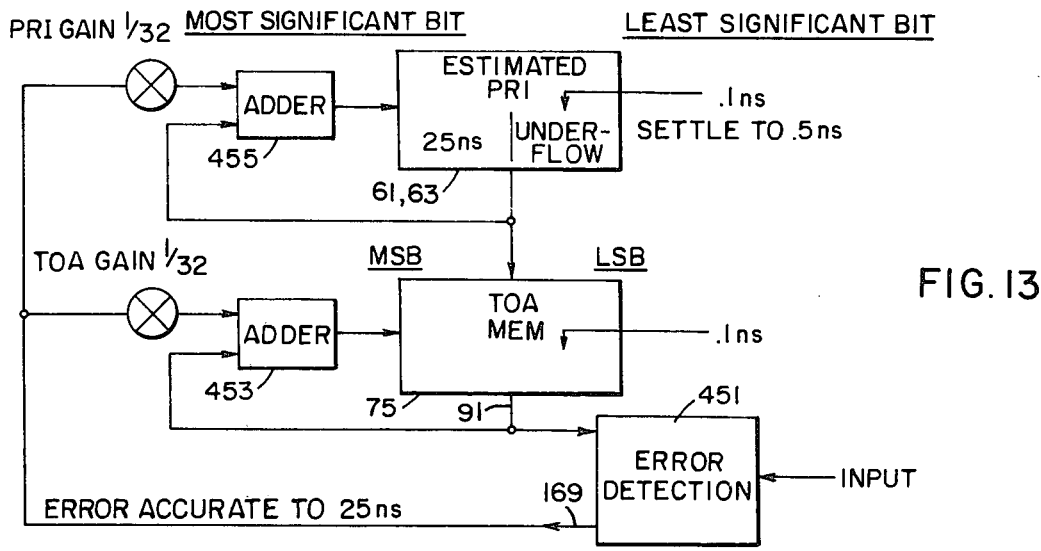
FIG. 13 is a fragmental block diagram illustrating how high precision is obtained in the practice of this invention.

FIG. 13 is a block diagram giving an overall view of the TOA and PRI loops. The error from the error detector 451 measured to an accuracy of 25 ns is multiplied respectively by the TOA gain and the PRI gain. The product is algebraically added to the TOA and the PRI respectively in the adders 453 and 455, averaged in the estimated PRI 61-63 and the TOA 75. The TOA and the PRI are averaged to 0.1 ns.

While the preferred embodiments of this invention have been disclosed herein, many modifications thereof are feasible. This invention is not to be restricted except insofar as necessitated by the spirit of the prior art.

I claim:

1. Apparatus for tracking a plurality of radar threats each threat including a train of pulses, the said apparatus including:

means for processing said threats to determine the frequency, pulse repetition interval, and predicted times of arrival parameters of each of said threats;

means for separately storing the frequency, pulse repetition interval, predicted time of arrival for each of said threats; and time multiplexing means connected to said storing means and sequentially responsive to the parameters of each of said threats for correcting the parameters to set each of said threats in tracked condition.

2. The apparatus of claim 1 for tracking at least first and second threats including first and second pulse trains respectively wherein the time-multiplexing means includes:

first means for generating a separate prediction window for each pulse of the train of said first threat and for each pulse of the train of said second threat;

means cooperative with each of said windows for determining the time position of each pulse of the train of said first threat in its corresponding window and of each pulse of the train of said second threat in its corresponding window, said time position determining means operating in time-shared relationship first for said first threat and then for said second threat and then again for said first threat and so on, the operation of each said first threat and said second threat taking place during an interval that is short compared to the pulse repetition intervals for each of said threats; and second means for generating tracking corrections for the first and second threats respectively; said tracking corrections for said first threat being generated subsequent to the determination of the time position of a pulse of said first threat in the window corresponding to that pulse, and said tracking corrections for said second threat being generated subsequent to the determination of the time position of a pulse of said first threat in the window corresponding to that pulse to set the first and second threats in tracked position; said first and second generating means operating in time-sharing relationship with respect to said first and second threats over a selected time interval including the time of arrival of each pulse, said storing means being operative at times between the selected time intervals during which said determining means is operative.

3. The apparatus of claim 2, said time multiplexing means further comprising:

means for transferring said parameters from said storing means to said multiplexing means at times between the selected time intervals during which said determining means is operative.

4. The apparatus of claim 1 wherein the multiplexing means is responsive to the predicted time of arrival of a pulse of the threat signal during repetitive cycles of the time multiplexing means to correct the parameters of said threat signal and to set each of said threats in tracked condition, each cycle of the multiplexing means occurring during a separate, selected time interval including the time of arrival of the pulse corresponding to the predicted time of arrival provided by said storing means; said storing means being responsive to the multiplexing means to store the parameters of each threat between the selected interval when the parameters of the threat are being corrected during one cycle and the selected interval when the parameters of the threat are being corrected during a succeeding cycle; and said apparatus further comprising: means for transferring the parameters of a threat from said storing means to the multiplexing means at times between the selected time intervals when said determining means is operative.

5. The apparatus of claim 1 wherein said time-multiplexing means includes:

means for sequentially receiving the parameters of each of said threat signals from said storing means; and for determining a tracking correction for the parameters of each of said threat signals after receiving the parameters of each of said threat signals and correcting the parameters of each of said threat signals; and means for returning the corrected parameters of each of said threat signals to said storing means, whereby said threat signals are set in tracked condition through correction of the parameters of each of said threat signals.

6. The apparatus of claim 1 wherein said time multiplexing means includes:

means for generating a window signal having a predetermined interval and a tracking position within said predetermined interval;

means for selecting from a plurality of pulses that occur within the predetermined interval of the window signal the pulse whose time of arrival is nearest the tracking position of the window signal, said selecting means being responsive to said window signal generating means; and means for comparing the predicted time of arrival of the next pulse of a selected threat signal with the occurrence of the pulse selected by said selecting means.

7. The apparatus of claim 6 wherein the selecting means includes:

means for comparing the smallest positive offset of the occurrence of a pulse from the tracking position of the window signal with the smallest negative offset of the occurrence of a pulse from said tracking position; and means for selecting the pulse having the smallest offset to determine the pulse whose time of arrival is nearest the tracking position of the window signal.

8. The apparatus of claim 1 wherein said multiplexing means includes:

means for generating a window signal having a predetermined interval and a tracking position within said predetermined interval;

means for counting the number of successive times that pulses of each threat signal have been denied access to a window; and means for selecting for access to a window the pulse of the threat signal for which the number of successive times that pulses have been denied access to a window is the highest at the time the window is sought, said selecting means being responsive to said counting means.

9. The apparatus of claim 5 wherein the counting means includes:

means for initializing the number of successive times that pulses of a threat signal have been denied access to a window when a pulse of that threat signal has been selected for access to a window by said selecting means.

10. The method of tracking a plurality of threat signals, each threat signal being composed of a train of pulses and having parameters including a carrier frequency, a pulse repetition interval, and a predicted real time of arrival of the pulses of each threat, said method comprising:
  receiving said threat signals:
  processing said threat signals to determine the parameters for each of said threat signals;
  storing the parameters in a storing means;
  transmitting the predicted time of arrival of the next pulse of each of said threat signals from said storing means prior to selected time intervals including the predicted time of arrival of each of said next pulse of said threat signals, the predicted time of arrival corresponding to each of said threat signals being transmitted in time-shared succession;
  generating a separate window for each said next pulse of each threat signal in response to the predicted time of arrival transmitted from said storing means;
  determining the position of said next pulse of each threat signal in the separate window generated for said next pulse;
  correcting the predicted time of arrival for a subsequent pulse of each threat signal, said predicted times of arrival being corrected in time-shared succession;
  returning the corrected predictions of time of arrival for each said subsequent pulse of said threat signals to said storing means; and
  repeating the steps of generating a separate window for each next pulse, determining the position of each said next pulse of each threat signal in the separate window, correcting the predicted time of arrival for a subsequent pulse of each threat signal, and returning the corrected predictions of time of arrival for each said subsequent pulse of said threat signals to said storing means to track said threat signals.

11. The method of claim 10 wherein said determining step includes the steps of:
  comparing the smallest positive offset of the occurrence of a pulse from a tracking position of the window signal with the smallest negative offset of the occurrence of a pulse from said tracking position; and
  selecting the pulse having the smallest offset to determine the position of each next pulse of each threat signal in the separate window generated for said next pulse.

12. The method of claim 10 wherein said determining step includes the steps of:
  counting the number of successive times that pulses of each threat signal have been denied access to a window; and
  selecting for access to a window the pulse of the threat signal for which the number of successive times that pulses have been denied access to a window is the highest among threat signals having pulses that demand the window signal during the selected interval of the window signal.

13. The method of claim 12 wherein said counting step includes the step of:
  initializing the number of successive times that pulses of a threat signal have been denied access to a window when a pulse of that threat signal has been selected for access to a window.

14. The method of tracking a plurality of radar threats, each threat being composed of a train of pulses and having parameters including a carrier frequency, a pulse repetition interval, and predicted time of arrival, of the respective pulses of each threat signal said method comprising:
  receiving said threat signals;
  processing the received threat signals to derive the parameters of each threat signal;
  storing the pulse repetition interval and carrier frequency of each threat signal;
  deriving new times of arrival for the pulse of each threat signal separately, in successive, time-sharing relationship during a first sub-interval when the predicted time of arrival is greater than the sum of one-half the width of the window signal plus the set-up time for receiving said threat signals; and
  correcting the time of arrival and the pulse repetition interval for each of said threat signals on a time-shared basis to correct errors between the predicted time of arrival and the occurence of the pulse of the threat signal, said correction being effected for each of said threat signals over a selected time interval prior to the time of arrival corresponding to the subsequent pulse for each of said threat signals.

15. The method of claim 14, said method further comprising the steps of:
  assigning priorities to the threat signals and
  selecting the pulse of the threat signal with the highest priority from pulses of more than one threat signal within said selected interval.

16. The method of claim 14 wherein said step of deriving includes:
  comparing the predicted time of arrival with the sum of one-half the width of the window signal and the set-up time for receiving said threat signals, said comparison being made for each of said threat signals in succession;
  subtracting the value of said sub-interval from the predicted time of arrival when the predicted time of arrival is greater than the sum of one-half the window signal plus the set-up time for receiving the threat signal; and
  storing the difference between said sub-interval and the predicted time of arrival as a new predicted time of arrival when the value of said sub-interval is subtracted from the predicted time of arrival.

17. The method of tracking a plurality of threat signals, said method comprising:
  producing a window signal, said window signal having a selected interval and having a zero position within said interval;
  detecting pulses of said threat signals which occur in the interval of said window signal;
  determining which pulse of a plurality of pulses that occur in the interval of and prior to the zero position of the window signal has the minimum deviation from said zero position;
  determining the deviation from said zero position of the first pulse which occurs in the interval of and subsequent to the zero position of the window signal; and
  selecting from the pulse having the minimum deviation prior to the zero position of the window signal, and the first pulse subsequent to the zero position of the window signal the pulse having the minimum deviation from said zero position.

* * * * *